Feb. 11, 1964  G. E. DUNN  3,120,744
UNIVERSAL JOINT
Filed Oct. 19, 1961  2 Sheets-Sheet 1
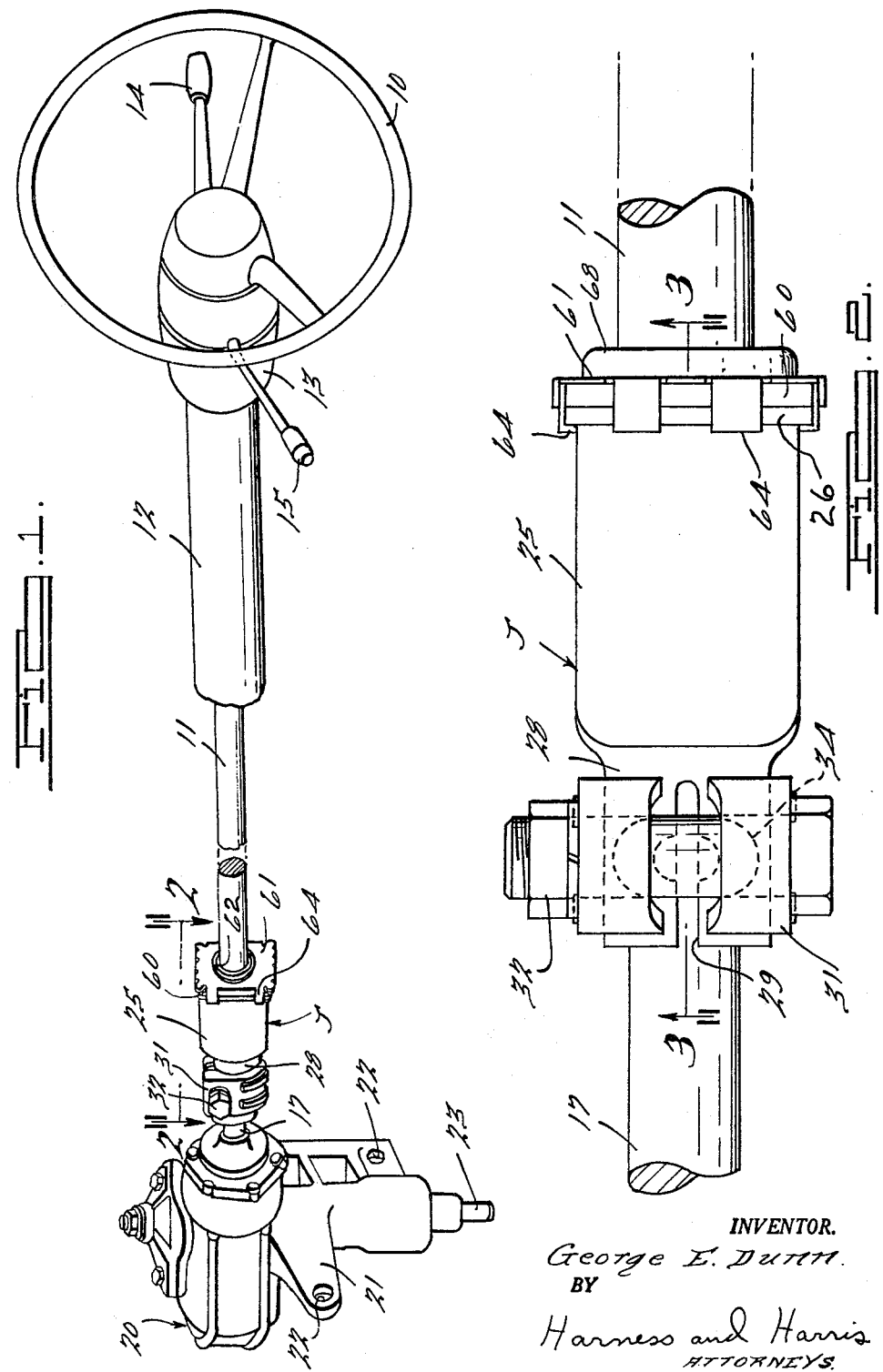
INVENTOR.
George E. Dunn.
BY
Harness and Harris
ATTORNEYS.

Feb. 11, 1964 G. E. DUNN 3,120,744
UNIVERSAL JOINT
Filed Oct. 19, 1961 2 Sheets-Sheet 2
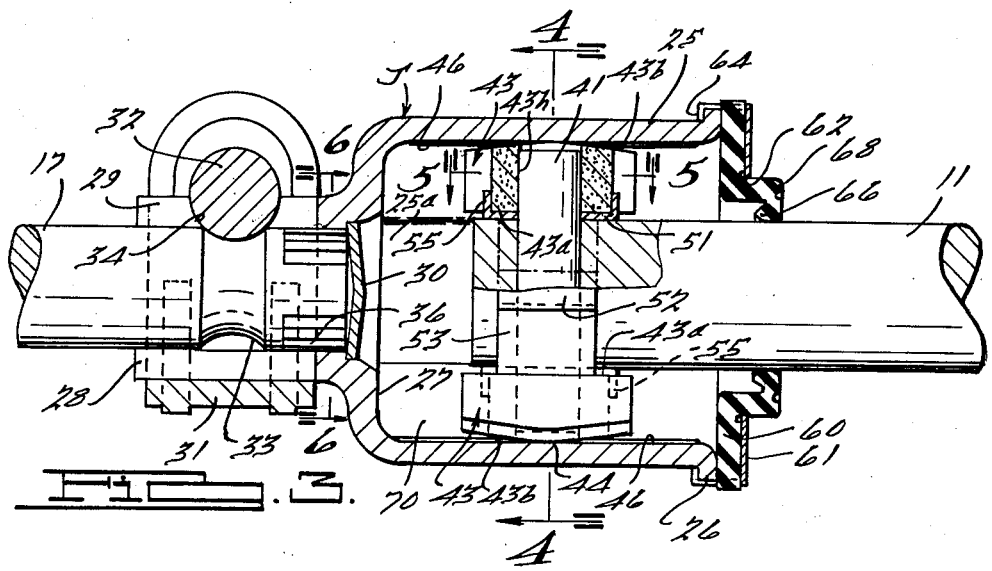
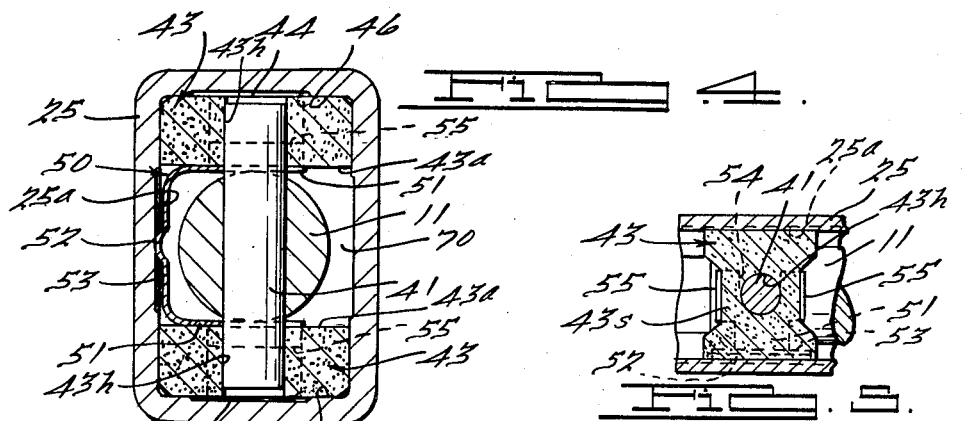
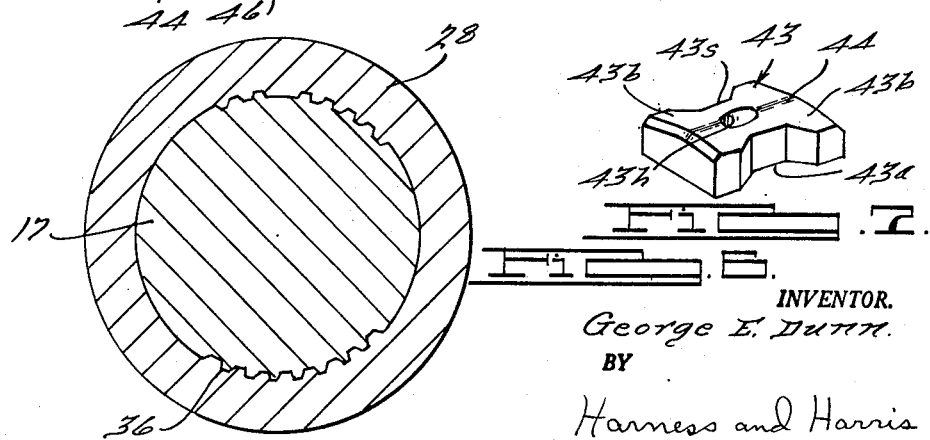
INVENTOR.
George E. Dunn.
BY
Harness and Harris
ATTORNEYS

United States Patent Office 3,120,744
Patented Feb. 11, 1964

3,120,744
UNIVERSAL JOINT
George E. Dunn, Dearborn, Mich., assignor to Chrysler Corporation, Highland Park, Mich., a corporation of Delaware
Filed Oct. 19, 1961, Ser. No. 146,279
4 Claims. (Cl. 64—8)

This invention relates to a universal joint and particularly to a universal joint adapted for the connection of a vehicle steering wheel shaft to a steering gear worm shaft.

It is a primary object of this invention to provide an improved, simplified, type of shaft connecting universal joint connection that is rugged, permanently sealed and permanently lubricated.

It is still another object of this invention to provide a rod or shaft connecting universal joint that uses the maximum number of stamped and cast parts so that machining costs are a minimum.

It is a further object of this invention to provide a simplified form of sealed, lubricated, universal joint wherein means associated with the rocker shoes of the joint limit the angularity of torque transmission and protect the joint flexible seal against damage.

It is still another object of this invention to provide a simplified form of limited angle universal joint wherein axial freedom in the joint between the connected shafts provides longitudinal vibration damping means.

It is still another object of this invention to provide a universal joint with axially movable, torque transmitting, rocker shoes that have resilient means associated therewith that serve as wear take-up means to eliminate torsional free play, rattle and shoe slapping.

It is still another object of this invention to provide a joint with rocker shoes that are axially movable and a flexible shaft seal having a shaft receiving aperture that is formed by an O-ring sealing element that is an integral part of the shaft seal.

It is a further object of this joint to provide a cover plate for the joint open end that rigidly reinforces the flexible shaft seal and resists axial joint separation.

Other objects and advantages of this invention will be apparent from the following description and a study of the related drawings wherein:

FIG. 1 is a plan elevational view, with parts broken away and shown in sections, o fa vehicle steering mechanism embodying this invention;

FIG. 2 is an enlarged fragmentary side elevational view taken along the line and in the direction of the arrows 2—2 of FIG. 1;

FIG. 3 is a sectional elevational view taken along the line and in the direction of the arrows 3—3 of FIG. 2;

FIG. 4 is a sectional elevational view taken along the line of and in the direction of the arrows 4—4 of FIG. 3;

FIG. 5 is a sectional elevational view taken along the line of and in the direction of the arrows 5—5 of FIG. 3;

FIG. 6 is a sectional elevational view taken along the line of and in the direction of the arrows 6—6 of FIG. 3; and FIG. 7 is a perspective view of the rocker shoes used in this universal joint.

In FIG. 1 there is shown a motor vehicle steering mechanism comprising a steering wheel 10 that is drivingly connected to a steering shaft 11 by any appropriate means. The steering shaft 11 is normally enclosed by a steering shaft tube 12 that mounts at its upper end a transmission gear ratio selector lever 14 and a turn signal selector lever 15. The steering shaft 11 is adapted to be drivingly connected to the worm shaft 17 of the steering gear unit that is generally designated by the reference numeral 20. Steering gear unit 20 is adapted to be rigidly mounted on a portion of the associated vehicle body or chassis frame by means of its mounting flange 21 that has several bolt receiving bores 22. The steering gear unit 20 includes the usual cross shaft 23 to which the steering pitman arm (not shown) is connected. Further description of the steering gear unit 20 is not thought to be necessary as the invention to be claimed and hereafter described relates to the universal joint J that drivingly interconnects the steering shaft 11 and the worm shaft 17.

The universal joint J that interconnects shafts 11 and 17 comprises a cup-like stamped housing 25 of rectangular cross-sectional configuration that has an outwardly extending lip-like flange 26 extending about its open upper end. The bottom wall 27 of the cup-like housing 25 has a tubular collar 28 projecting downwardly therefrom. This tubular collar 28 is slotted longitudinally, as shown at 29, to provide for diametrical contraction of the collar 28 about the worm shaft 17 that is inserted therein. A plug 30 closes the inboard end of the collar 28. A C-clamp 31 extends concentrically about the housing collar 28 and the clamp 31 has a bolt and nut means 32 to compress the split collar 28 about the worm shaft 17. From FIG. 3 it will be noted that the bolt 32 of the C-clamp 28 extends into a preformed groove 33 in the worm shaft 17 so as to anchor the shaft 17, the clamp 31 and the housing collar 28 against relative axial movement. It is thought to also be clear from FIGS. 2 and 3 that the split collar 28 also has a groove-like cut 34 extending transversely thereacross that also seats the C-clamp contractor bolt 32. The interior bore of the split collar 28 is formed with longitudinally extending splines 36 (see FIG. 6) or similar non-slip formations to prevent relative rotation between the worm shaft 17 and housing collar 28.

The lower end of the steering shaft 11, that extends into the cup-like casing 25 through the open upper end thereof, carries cross-pin 41. Journaled on the outwardly projecting ends of the cross pin 41 are a pair of rocker shoes 43. The shoes 43 are I-shaped in plan configuration as can be clearly seen from FIGS. 5 and 7. The undersides 43a of the shoes 43 are preferably flat. The outer sides 43b are of an inverted V-shaped configuration so as to provide a crest 44 as the shoe bearing contact with the slideway portions 46 on the opposed inner walls of the casing 25. The outer sides 43b are flat, angled, intersecting planes as can be clearly seen from FIG. 3. There is a reason for making these outer surfaces 43b in the particular angled relationship shown. The angling of the planar surfaces 43b limits the rocking of the shaft 11 with respect to the shaft 17, in the plane of the shafts, to an angle of approximately five degrees (5°). This limiting of the angular swing of the shaft 11 relative to shaft 17 prevents damage to the flexible, rubber-like seal 60 that closes the open end of the casing 25. It is thought to be obvious that unless some movement restricting means is applied to shaft 11 this shaft would wedge the seal 60 against either the rigid cover plate 61 or the casing 25 and chew up the seal 60 so that the sealing properties of seal 60 would be destroyed.

The particular I-shaped plan configuration of the rocker shoes 43 has a designed function that will now be explained. As the rocker shoes 43 are loosely journaled on the ends of the pivot pin 41, it is desirable to have some means to urge these shoes into sliding contact with the casing tracks 46 so as to prevent shoe rattle or slap and to also eliminate torsional free play. The substantially U-shaped spring clip 50, that is positioned between the undersides of the spaced rocker shoes 43, cooperates with the shoes 43 to keep them correctly positioned at all times to eliminate rattle or slap as well as torsional free play. The leg portions 51 of the spring clip 50 are compressed together when the clip is installed beneath the shoes 43 so that the spring legs 51 continuously exert an expanding force on the shoes 43 to urge the shoes into engagement with the casing shoe tracks 46. The spring 50 thus acts as a shoe wear take-up device. Considerable wear of the shoe crest 44 can occur without any deterioration of joint performance because of the spring action on the spaced floating shoes 43. Shoes 43 are preferably of some self-lubricating bearing material such as Oilite so that the pin 41 has a self-lubricated connection to the shoes 43.

As can be seen from FIG. 4, the spring 50 has a raised rib 52 extending transversely across its bight portion 53. Rib 52 is arranged to be slightly compressed against the housing side wall 25a when the spring and shoe assembly is mounted in the housing 25. The ends of legs 51 of the spring 50 are each notched at 54 (see FIG. 5) to provide seats to receive the cross pin 41. The side edges of the spring legs 51 are each provided with outwardly extending flange fingers 55 that are arranged to provide seats for the centrally positioned stem portion 43s of the I-shaped shoes 43. It is thought to be obvious from the foregoing description of the spring 50 that it not only prevents shoe rattle or slap and provides an automatic wear take-up device for the shoes, but in addition it provides a seating means for the shoes which insures that the shoes will be correctly positioned in the housing 25.

The open end of the cup-like housing 25 is adapted to be covered by a flexible rubber-like, sealing plate 60 that has an annular opening therein to receive the periphery of the shaft 11. The edge of the annular opening in the flexible sealing plate 60 is formed as an enlarged O-ring seal 66 to provide a flexible, leakproof, seal against the shaft 11. The area of the sealing plate 60 adjacent the O-ring 66 is shaped so that the O-ring seal 66 is free to shift with the shaft 11 without causing a break in the sealing connection between the O-ring 66 and the encircled portion of shaft 11.

From FIG. 2 it is clear that the outer edge of the flexible sealing plate 60 seats on the flange-like rim 26 at the open end of the housing 25. The rigid cover plate 61, that covers the outer side of seal plate 60, has an annular opening 62 through its central portion to receive the flexible control portion 63 of the seal plate 60. Arranged around the periphery of the cover plate 61 are a plurality of tabs 64 that are used to anchor the cover plate to the rim-like flange 26 on the housing 25. The tabs are bent down around the housing rim 26 to fix the cover plate 61 to the housing 25. The tab connection of the cover plate 61 to the housing rim 26 not only anchors the cover plate in position and locks the rocker shoes inside the housing, but in addition the tabs 64 can be used to control the amount of seal compression at the housing rim. As the interior of the housing is filled with a grease-like lubricant it is necessary that the seal around the O-ring 66 and at the housing rim 26 should be leakproof. Tabs 64 thus serve a dual function. When the tabs are properly applied to the housing rim 26 the joint J can withstand axial loads in excess of 500 pounds. The O-ring seal 66 and the lubricant within the housing 25 cooperate to provide for the shaft 11 to slide axially through the O-ring without change in coupling dimensions.

The opposed casing inner side walls can be undercut or grooved as shown at 46 to reduce surface friction between the rocker shoes 43 and the portions of the casing interior engaged thereby. The undercutting also allows for free flow of lubricant around the rocker shoes.

From the foregoing description of this universal joint it is thought to be clear that a novel, economical, simplified form of limited angle universal joint has been provided that requires the minimum of expensive machined parts. Second, the joint has self-lubricating rocker shoes that include resilient wear take-up means to eliminate shoe slap, rattle and torsional free play. Third, this joint provides considerable axial movement lengthwise of the housing 25 which movement accommodates installation variations and also supplies longitudinal vibration damping means. Fourth, the specific U-shaped rocker shoe supporting spring is designed so as to give constant pressure between the shoe outer faces and sides and the adjacent casing interior wall portions. Fifth, the flexible sealing plate with the integral O-ring shaft seal gives maximum joint flexibility with improved sealing properties. Sixth, the rigid housing cover cooperates with the casing end rim to control compression of the resilient sealing plate and to limit axial separation of the joint connected shafts.

I claim:

1. A universal joint for interconnecting a pair of shafts comprising a rectangularly-shaped cup-like housing having collar means projecting from its bottom end adapted to be drivingly connected to a first shaft, said housing cup interior having opposed, longitudinally extending, side wall portions connected at the opposite ends by a flat bottom wall and providing pairs of flat-sided grooves of channel-like cross section adapted to slidably receive a pair of spaced, oppositely disposed, rocker shoes, each rocker shoe having an outer face formed from outwardly converging planar surfaces arranged and shaped to provide substantially line contact with the flat bottom wall of the adjacent channel-like housing groove to permit limited angular oscillation of the rocker shoe in a plane extending lengthwise of the housing shoe receiving groove, a second shaft extending into said housing through the open end thereof having a cross pin projecting from opposite sides thereof adjacent the shaft end portion positioned in the housing with the projecting cross pin portions journaling said rocker shoes, resilient means extending between the opposed rocker shoes urging said shoes apart and into engagement with said housing channel bottom walls, and a cover for the open end of said housing comprising a flexible sealing plate having an opening therein bounded by an oscillatable O-ring formation to sealingly receive said second shaft and outer peripheral portions sealingly engaged with the open end of said housing, and a rigid cover plate mounted on the casing and engaging the outer side of said sealing plate having an aperture in its central portion to receive the second shaft and the O-ring sealing portion of the flexible sealing plate, said rigid cover plate having tabs on its periphery connecting the rigid cover plate to the open end of the cup-like housing and controlling the compression of the outer periphery of the flexible sealing plate against said housing open end portion.

2. A universal joint for interconnecting a pair of shafts comprising a cup-like housing of rectangular cross sectional configuration having a split collar means on its closed bottom end adapted to be drivingly connected to a first shaft, said housing having opposed, longitudinally extending, interior side wall portions connected at the opposite ends by flat bottom walls and providing a pair of spaced, flat-sided, grooves of channel-like cross section adapted to slidably receive a pair of spaced, oppositely disposed, rocker shoes, each rocker shoe having an outer face shaped to provide substantially line contact with the bottom wall of the adjacent channel-like housing groove portion with said outer face of each rocker being formed from a pair of outwardly converging planar surfaces that are adapted to be selectively rocked into planar contact with the adjacent groove bottom wall to limit the angular oscillation of the rocker shoe in a plane extending lengthwise of the housing shoe receiving groove, a second shaft extending into said housing through the open end thereof having a cross pin projecting from opposite sides thereof adjacent the shaft end portion positioned in the housing with the projecting cross pin portions journaling said rocker shoes, spring means mounted on said cross pin between the opposed rocker shoe underfaces urging said shoes apart and into engagement with said housing channel flat bottom walls with portions of said spring means locating said shoes relative to said housing and said cross pin, and a cover for the open end of said housing comprising a flexible sealing plate having one opening therein shaped to sealingly receive said second shaft and peripheral portions thereof sealingly engaged with the open end of said housing.

3. A universal joint for interconnecting a pair of shafts comprising a cup-like housing of rectangular cross sectional configuration having a split collar means projecting from its closed bottom end adapted to be drivingly connected to a first shaft, said housing having opposed, longitudinally extending, interior side wall portions connected at the opposite ends by flat bottom walls and providing a pair of spaced, flat-sided, grooves of channel-like cross section adapted to slidably receive a pair of spaced, oppositely disposed, rocker shoes, each rocker shoe having an outer face shaped to provide substantially line contact with the flat bottom wall of the adjacent channel-like housing groove portion with said outer face of each rocker being formed from a pair of outwardly converging planar surfaces that are adapted to be selectively rocked into planar contact with the adjacent groove bottom wall to limit the angular oscillation of the rocker shoe in a plane extending lengthwise of the housing shoe receiving groove, a second shaft extending into said housing through the open end thereof having a cross pin projecting from opposite sides thereof adjacent the shaft end portion positioned in the housing with the projecting cross pin portions journaling said rocker shoes, spring means mounted on the cross pin between the opposed rocker shoe underfaces urging said shoes apart and into engagement with said housing channel flat bottom walls with portions of said spring means locating said shoes relative to said housing and said cross pin, and a cover for the open end of said housing comprising a flexible sealing plate having one opening therein shaped to sealingly receive said second shaft and peripheral portions thereof sealingly engaged with the open end of said housing, said rocker shoes being of approximately I-shaped plan configuration and formed of self lubricating material.

4. A universal joint for interconnecting a pair of shafts comprising a cup-like housing having collar means projecting from its bottom end adapted to be drivingly connected to a first shaft, said housing cup having opposed, longitudinally extending, interior side wall portions connected at the opposite ends by flat bottom walls and providing a pair of spaced, flat sided grooves of channel-like cross section adapted to slidably receive a pair of spaced, oppositely disposed, rocker shoes, each rocker shoe having an outer face shaped to provide substantially line contact with the flat bottom wall of the adjacent channel-like housing groove, said rocker outer face being formed from a pair of outwardly converging planar surfaces that are adapted to be rocked into planar contact with said adjacent groove flat bottom wall to limit the angular oscillation of the rocker shoe in a plane extending lengthwise of the housing shoe receiving channels, a second shaft extending into said housing through the open end thereof having a cross pin projecting from opposite sides thereof adjacent the shaft end portion positioned in the housing with the projecting cross pin portions journaling said rocker shoes, resilient means mounted on the cross pin and engaging the opposed rocker shoes urging said shoes apart and into engagement with said housing groove flat bottom walls, and a cover for the open end of said housing comprising a flexible sealing member having one opening therein peripherally bounded by an oscillatable O-ring portion to sealingly receive said second shaft and outer peripheral portions sealingly engaged with the open end of said housing.

References Cited in the file of this patent

UNITED STATES PATENTS

| 919,651 | Spicer | Apr. 27, 1909 |
| 2,997,320 | Sutherland | Aug. 22, 1961 |
| 3,016,721 | Davis | Jan. 16, 1962 |
| 3,029,617 | Marquis et al. | Apr. 17, 1962 |

FOREIGN PATENTS

| 350,954 | France | Apr. 22, 1905 |
| 199,247 | Great Britain | June 21, 1923 |
| 522,036 | Great Britain | June 6, 1940 |